United States Patent
Bardale

(10) Patent No.: US 8,966,188 B1
(45) Date of Patent: Feb. 24, 2015

(54) RAM UTILIZATION IN A VIRTUAL ENVIRONMENT

(75) Inventor: Trimbak Somnathappa Bardale, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 974 days.

(21) Appl. No.: 12/968,417

(22) Filed: Dec. 15, 2010

(51) Int. Cl.
*G06F 12/00* (2006.01)

(52) U.S. Cl.
USPC ............... 711/147; 711/6; 711/104; 711/154; 718/104

(58) Field of Classification Search
USPC .................................... 711/204, 147
See application file for complete search history.

(56) References Cited

U.S. PATENT DOCUMENTS

| | | | | |
|---|---|---|---|---|
| 8,086,799 B2* | 12/2011 | Mondal et al. | ................. | 711/116 |
| 2011/0055471 A1* | 3/2011 | Thatcher et al. | ............... | 711/114 |
| 2011/0191522 A1* | 8/2011 | Condict et al. | ................. | 711/103 |

* cited by examiner

*Primary Examiner* — April Y Blair
*Assistant Examiner* — Prasith Thammavong
(74) *Attorney, Agent, or Firm* — Campbell Stephenson LLP

(57) ABSTRACT

Various systems and methods for sharing data in a virtual environment are disclosed. For example, one method involves receiving a request to access data. The request can be received from a first virtual machine of a plurality of virtual machines. The method then involves retrieving a signature for the data where the signature is stored in a deduplicated data store. Next, the method involves detecting whether the signature is included in a map. In order to do so, the method compares the signature with entries in the map. The entries in the map identify data stored in RAM. The data is also stored in the deduplicated data store. If the signature is found in the map, the method involves granting the request to access the data. Otherwise, the method involves creating a new entry in the map and adding the signature to the new entry.

17 Claims, 6 Drawing Sheets

| Block | Fingerprint | Location | Allocated to | Shared by |
|---|---|---|---|---|
| 1 | X | 0x00 | VM1 | VM1, VM3 |
| 2 | B | 0x4K | VM2 | VM2, VM8 |
| 3 | T | 0x8K | VM1 | VM1, VM2 |

*FIG. 4A*

| Block | Location |
|---|---|
| 1 | 0x00 |
| 3 | 0x8K |
|  | 0x16K |
|  | 0x24K |
|  | 0x32K |
|  | 0x40K |
|  | 0x48K |
|  | 0x56K |

*FIG. 4B*

| Block | Location |
|---|---|
| 3 | 0x192K |
|  | 0x200K |
|  | 0x208K |
|  | 0x216K |
|  | 0x224K |
|  | 0x232K |
|  | 0x240K |
|  | 0x248K |

*FIG. 4C*

RAM UTILIZATION IN A VIRTUAL ENVIRONMENT

FIELD OF THE INVENTION

This invention relates to computer memory and, in particular, to efficiently utilizing random access memory (RAM) in a virtual environment.

DESCRIPTION OF THE RELATED ART

A virtual machine, in general terms, is a software construct that acts as a physical computer system. For instance, a virtual machine can run applications, provide services, and process commands. Multiple virtual machines can be implemented on a single physical computer system and can share the resources (e.g., memory and processing power) of the physical computer system the virtual machines are implemented on. Each virtual machine can run its own operating system. In some cases, this results in multiple instances of a single operating system being executed simultaneously on a single physical computer system. In other cases, various different operating systems can be executed simultaneously on the single physical computer system.

Virtualization software installed on the physical computer system controls the virtual machines' access to the system's resources. For example, the virtualization software can allocate portions of the system's memory to each virtual machine. Effectively utilizing physical resources in systems that employ virtual machines is an ongoing challenge.

SUMMARY OF THE INVENTION

Various systems and methods for sharing data in a virtual environment are disclosed. For example, one method involves receiving a request to access data. The request can be received from a first virtual machine of a plurality of virtual machines. The method then involves retrieving a signature for the data where the signature is stored in a deduplicated data store. Next, the method involves detecting whether the signature is included in a map. In order to do so, the method compares the signature with entries in the map. The entries in the map identify data stored in RAM. The data is also stored in the deduplicated data store. If the signature is found in the map, the method involves granting the request to access the data. Otherwise, the method involves creating a new entry in the map and adding the signature to the new entry.

In an embodiment, the method involves modifying a map that identifies a single virtual machine's data. The method also involves adding an identifier for the virtual machine that requested access to the data to the map that includes the signatures.

In an embodiment, the data includes an operating system component. The method also involves, in an embodiment, reading the data to which access is requested from the deduplicated data store and writing the data to the RAM.

In an embodiment, the deduplicated data store comprises a single instance storage device. In this embodiment, the request to access data specifies a block identifier and the method determines a file identifier that corresponds to the specified block identifier.

In an embodiment, the method involves receiving a request to write a chunk of data. The method then involves detecting whether the chunk of data is stored in RAM. If so, the method involves creating a copy of the chunk of data, allocating a location in the RAM, writing the chunk of data to the allocated location, and modifying the map that includes the signatures.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 4A is a table showing a map of RAM, according to one embodiment.

FIG. 4B is a block diagram showing a map of RAM assigned to a single virtual machine, according to one embodiment.

FIG. 4C is a block diagram showing a map of RAM assigned to a single virtual machine, according to one embodiment.

Figure 1:
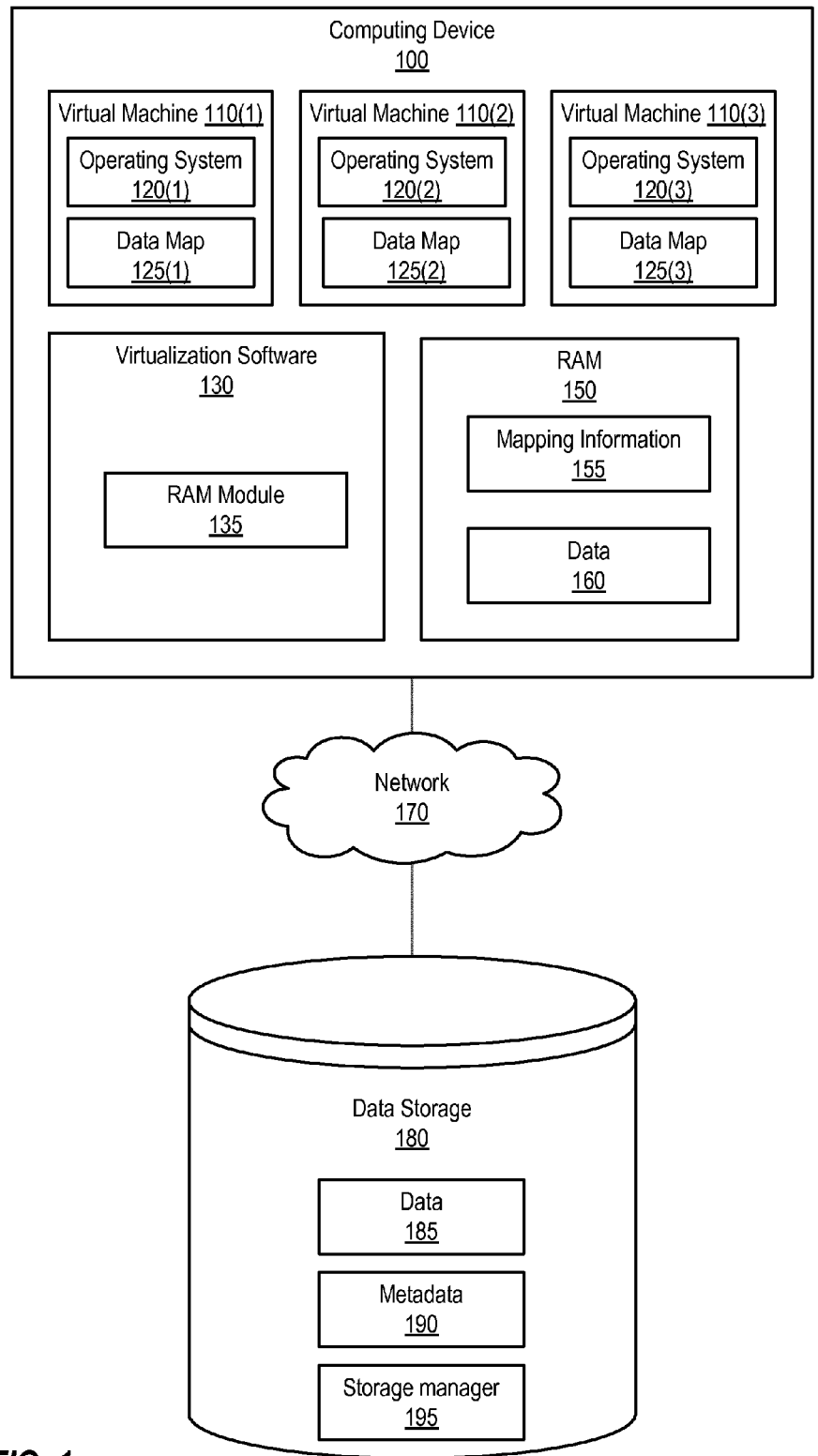
FIG. 1 is a block diagram of a system that utilizes RAM in a virtual environment, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

One or more virtual machines can be installed on a physical computer system. The physical system is known as a host, or parent partition, and includes a hypervisor, or virtualization software that provides virtualization services. A virtual machine installed in a host is known as a guest, or child partition. Virtual machines installed on a physical computer system share resources of the physical computer system. Each virtual machine can have an operating system installed.

One service that can be provided by the virtualization software is controlling access to the host's random access memory (RAM). The amount of RAM available on a given host, and the techniques used to manage the RAM, can significantly limit the performance of a virtual environment. That is, if the host's RAM is over-utilized, data used by the virtual machines is stored in memory outside the RAM, such as a hard disk or network attached storage. Accessing such data is typically slow compared to accessing data stored in RAM. Furthermore, the host system may only have a single communications channel to the external storage. Using this channel to process requests from multiple virtual machines can represent a bottleneck.

Each virtual machine installed on a host can demand a given amount of RAM to operate effectively. Thus, the size of the host's RAM can limit the number of virtual machines that can be installed on the host. Consider an example where a virtual machine uses 250 Mb of RAM to operate effectively. Unless the virtual machine has 250 Mb of RAM at its disposal, the virtual machine will perform poorly, e.g., as a result of excessive I/O operations to disk. In a system that has, for example, 1 Gb of RAM, installing 4 such virtual machines effectively consumes all of the host's RAM.

A virtual machine typically stores operating system components, such as applications, data libraries, and the like, in RAM. This data is typically not changed during operation of the operating system. Consider an example in which several virtual machines that use the same operating system are installed on a host. In this example, each virtual machine has a portion of RAM allocated to the virtual machine and stores operating system components in the RAM allocated to the virtual machine. As can be seen, this can lead to multiple copies of the same operating system components being stored in the host's RAM. Such duplication is redundant and unnecessarily consumes valuable RAM storage capacity.

Not only does storing multiple copies of the same operating system components limit the number of virtual machines that can be installed, doing so increases the amount of disk I/O operations used to process commands. That is, when the system's RAM is largely consumed with operating system components, other data, such as user data, is stored elsewhere, e.g., on a hard disk, as there is inadequate space in RAM. As noted above, disk I/O operations to access (e.g., read and/or write) the data in such memory locations are typically significantly slower than accessing data in RAM. Thus, the increase in the amount of disk I/O operations used to access data as a result of inefficient RAM utilization tends to degrade system performance.

FIG. 1 is a block diagram of a system that utilizes RAM in a virtual environment. As shown, the system of FIG. 1 includes computing device 100, which includes several virtual machines 110(1), 110(2), and 110(3), collectively referred to as virtual machines 110. Virtual machine 110(1) includes operating system 120(1) and data map 125(1). Virtual machine 110(2) includes operating system 120(2) and data map 125(2). Virtual machine 110(3) includes operating system 120(3) and data map 125(3). Computing device 100 also includes virtualization software 130, which includes RAM module 135, and RAM 150, which includes mapping information 155 and data 160. Computing device 110 is coupled by network 170 to data storage 180, which includes data 185, metadata 190, and storage manager 195.

Computing device 100 can include one or more computing devices. Such computing devices can include servers, personal computing devices, laptop computers, net books, personal digital assistants, cellular phones, or the like.

Data storage 180 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Data storage 180 may also include arrays of such storage devices. Data storage 180 can be included within, directly connected to, or connected via a network to computing device 100.

In conjunction with virtualization software 130 and resources of computing device 100, virtual machines 110 are capable of functioning as independent entities that provide the same services as a separate hardware system provides, such as running applications and performing various I/O operations. Each operating system 125 can be one of, for example, various Windows™ and/or UNIX based operating systems. Operating systems 120 can include multiple instances of the same operating system as well as instances of different operating systems. For example, operating systems 120(1) and 120(2) can be instances of Windows 2003, while operating system 120(3) can be an instance of Linux. Each of operating systems 120 can include such components as programs, libraries, configuration data, I/O information, drivers, security features, and the like. In an embodiment, these components are stored in RAM, e.g., in data 160, while in other embodiments, these components are stored in external (relative to computing device 100) storage.

Virtualization software 130 can manage virtual machines 110's access to various resources of the system shown in FIG. 1, such as computing device 100's processors (not shown) and data storage 180. For example, virtualization software 130 can allocate a portion of data storage 180 for exclusive use by each of virtual machines 110. Such a portion is known as a virtual disk. Virtual disks, and data stored on them, can be included in data 185.

Data storage 180 can be configured as a deduplicated data store. In this embodiment, storing redundant copies of data is avoided. For example, if storage manager 195 receives a request to write data to data 185, storage manager 195 can detect whether the data is already stored in data 185. If the data is stored in data 185, storage manager 195 can avoid writing an additional copy of the data to data 185. If identical data does not exist in data 185, storage manager can add the data to data 185. The data can include a chunk or block (e.g., a 4 Kb chunk of data), an object (e.g., a file or portion of a file), or any other physical or logical portion of data. In one embodiment, data storage 180 is implemented as a single instance storage (SIS) device. In this embodiment, a file system ensures that only a single copy of a given data item, e.g., file, is stored in data 185.

In order to detect whether a given data item is already stored in data 185, storage manager 195 can compare a signature for the data item with signatures for data items already stored in data 185. Storage manager 195 can calculate a signature for the data item or a signature for the data item can be received from the entity that requested the data item be written to data 185, e.g., one of virtual machines 110, as part of the write request. In an embodiment, the signature is known as a fingerprint. In this embodiment, metadata 190 includes a list of signatures, e.g., fingerprints, known as a fingerprint database. The fingerprint database can store a fingerprint for each data item stored in data 185. When a data item is written, e.g., by storage manager 195 to data 185, storage manager 195 also writes a fingerprint for the data item to metadata 190. Storage manager 195 can calculate fingerprints, for example, using a hash function. Fingerprints are typically shorter in length than the data they represent and uniquely identify the data. This allows storage manager 195 to quickly detect whether a given data item exists in data 185 by comparing the fingerprint for a data item with fingerprints of data stored in data 185.

Virtualization software 130, in particular RAM module 135, can also manage virtual machines 110's access to RAM 150. Virtual machines 110 can store data in RAM 150, in particular in data 160. Virtualization software 130 can allocate a specific portion of RAM 150 to one or more of virtual machines 110. For example, virtualization software 130 can evenly divide the total amount of RAM 150 by the number of virtual machines 110 and allocate the resulting amount of RAM to each of virtual machines 110. Such an allocation can involve specifying a start address and end address in the RAM for each virtual machine. Alternatively, RAM module 135 can dynamically allocate RAM to virtual machines 110. For example, when one of virtual machines 110 requests that data be stored in RAM, RAM module 135 can specify an address to store the data. RAM module 135 can tailor the amount of space allocated such that only the amount of space that the data will consume is allocated.

RAM module 135 can also ensure that multiple copies of the same data are not stored in RAM 150. For example, when an operating system is installed in one of virtual machines 110, the virtual machine 110 can request that RAM module 135 copy operating system components into RAM 150. The operating system components can be stored, for example, in data 185. The virtual machine requests that the operating system components be copied from data 185 into RAM 150. Before loading the requested operating system components into RAM 150, RAM module 135 can check if the operating system components are already stored in RAM 150, for example in data 160. In order to do so, RAM module 135 can retrieve a signature for a specified component, e.g., from metadata 190, and compare it with signatures that identify data stored in RAM 150. Signatures that identify data items stored in RAM 150 can be stored in mapping information 155. If RAM module 135 detects that a component is already stored in RAM 150, RAM module 135 can avoid copying an additional instance of the component to RAM 150.

Mapping information 155 can also identify, for each data item in RAM 150, the virtual machine(s) that requested that the data item be loaded into RAM 150. Consider an example in which virtual machine 110(3) requests that a data item be loaded into RAM 150. If RAM module 135 detects that the data item is already stored RAM 150, e.g., the data item was loaded into RAM 150 in response to a request by virtual machine 110(1) to load the data into RAM 150, RAM module 135 does not store an additional copy of the data item in RAM 150. Instead, RAM module 135 can update mapping information 155 to indicate that the data item was also requested by virtual machine 110(3). In this example, virtual machine 110(1) and virtual machine 110(3) are said to "share" the data item. That is, both virtual machines are able to access the shared data item although only a single copy of the data item exists in RAM 150.

Storing only a single copy of, for example, operating system components allows an exponential increase in the number of virtual machines that can be installed on a host. Doing so also frees space in RAM 150 for other data and so reduces the amount of disk I/O, which can improve performance for all virtual machines, since disk I/O can become a bottleneck. While the example above refers to operating system components, other types of data, such as user data, can be shared between virtual machines 110. RAM module 135 can also ensure only a single copy of such other data is written to RAM 150.

In response to a request by one of virtual machines 110 to load a requested data item into RAM 150, RAM module 135 can detect that the requested data item is not already present in RAM 150. In such a case, RAM module 135 can allocate a portion of RAM 150 to the requesting virtual machine and store the requested data item in the allocated portion of RAM 150. RAM module 135 can also update mapping information 155 to indicate that the requested data item is stored in RAM 150 and also to indicate which virtual machine has access to the requested data item or which virtual machine shares the requested data item. RAM module 135 can also update a data map 125 for the requesting virtual machine to indicate what data items the virtual machine has access to and what portions of RAM 150 the virtual machine is currently utilizing.

RAM module 135 can also process writes, or updates, to data that is stored in RAM 150. Modifying a data item that is stored in RAM 150 has the potential to affect all virtual machines that share the data item. Thus, RAM module 135 can take measures, as discussed with regard to FIG. 3, to ensure data access to shared data items by all virtual machines that share the data items is not disturbed due to writes to the data items in RAM 150.

Figure 2:
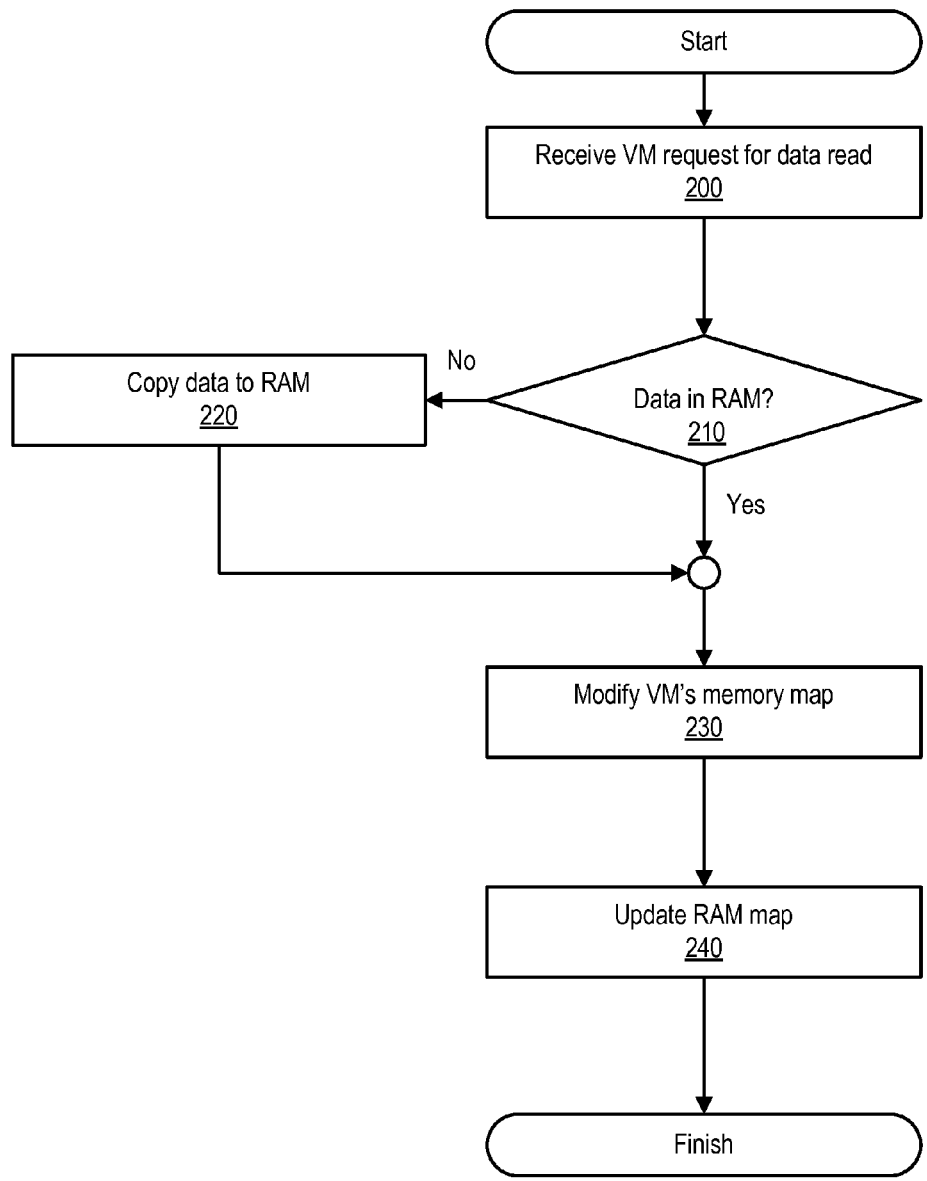
FIG. 2 is a flow diagram of a method of processing a read request in a virtual environment, according to one embodiment.

FIG. 2 is a flow diagram of a method of managing RAM in a virtual environment such that only a single copy of data is stored in the RAM, rather than multiple copies of the same data. The method can be performed by a RAM module, such as RAM module 135 of FIG. 1, using RAM, such as RAM 150 of FIG. 1, and a data storage device, such as storage device 180 of FIG. 1, which includes data and metadata, such as data 185 and metadata 190 of FIG. 1.

The method of FIG. 2 begins when a RAM module receives a request from a virtual machine to read a data item, as shown at 200. The request can include information that identifies a given data item, such as a block number, file identifier, physical address, fingerprint, or any other information that the RAM module can use to uniquely identify the data item. In an embodiment, the virtual machine determines whether the requested data item is currently stored in a portion of RAM allocated to the virtual machine prior to initiating a request to read the data item. If the requested data item is in RAM, the virtual machine can access the data item without initiating a request to the RAM module. The virtual machine can compare the information identifying the requested data item to information in a memory map for the virtual machine, where the memory map identifies items that the virtual machine has requested be loaded into RAM. In such an embodiment, if the virtual machine determines that the requested data item is not identified by information in the memory map, the virtual machine requests that the data item be loaded into RAM. In an embodiment, the unit of data specified by the virtual machine is translated into another unit. For example, if the virtual machine specifies a physical block, the RAM module can determine that the physical block stores data that is part of a given file and translate the request so that the file to which the data belongs is requested.

The RAM module determines, at 210, whether the requested data item is stored in RAM. For example, the requested data item can have been loaded in response to a previous request by another virtual machine to load the data into RAM. In order to detect whether the data is in RAM, according to an embodiment, the RAM module retrieves a fingerprint for the data item from metadata stored in a data storage device that stores deduplicated data. The fingerprints in the metadata identify data items stored in the storage device. These fingerprints were calculated and stored prior to receiving the request of 200, e.g., concurrently with processing write requests to write the data items to the data storage device. In an embodiment, processing the write requests involves deduplicating data in the data storage device, or insuring that only a single instance of a given item is stored in the data storage device. The RAM module compares the fingerprint retrieved from metadata on the data storage device with fingerprints stored, for example, in a RAM map in the RAM. The fingerprints stored in the RAM map identify data items that are stored in the RAM. If the RAM module detects that the retrieved fingerprint for the data item matches a fingerprint in the RAM, the data item is already stored in the RAM and the RAM module does not store an additional copy of the item in the RAM. In an alternative embodiment, the RAM module can calculate a fingerprint for the requested data item in response to receiving the request to read the requested data item, rather than retrieving a fingerprint for the requested data item from the data storage device metadata.

If the RAM module detects that the data item is not already stored in the RAM, e.g., the retrieved fingerprint for the data item does not match any fingerprint stored in the RAM, the RAM module copies the data to RAM at 220. Doing so involves reading the data item from the storage device. The storage device, in an embodiment, includes storage allocated to each virtual machine, such as one or more virtual disks assigned for exclusive access to each virtual machine on the host. The RAM module accesses the data storage assigned to the requesting virtual machine. Since the data storage device stores deduplicated data, the requested data item, in an embodiment, is not stored in the virtual machine's storage, but is instead shared, e.g., with one or more other virtual machines. That is, the data item can be stored in storage designated for another virtual machine. In this case, the RAM module can determine the location of the requested data item, e.g., by accessing metadata in the data storage device. Once the requested data item is located, the RAM module copies the requested data item to RAM. In an embodiment, the RAM module first allocates a portion of RAM for the requested data item and writes the requested data item to the allocated portion of RAM. The RAM module can assign the newly allocated portion of RAM to the virtual machine that requested the requested data item. Once the requested data item is stored in RAM, subsequent request by other virtual machines to access the requested data item can lead to the requested data item being shared in RAM. In an embodiment, the data written to RAM is marked as read-only data such that the data cannot be overwritten.

At 230, the RAM module updates the requesting virtual machine's memory map to indicate that the virtual machine has access to the requested data item. For example, the virtual machine's memory map can identify a given amount of RAM as allocated for the virtual machine. The memory map can include start and end addresses for the allocated RAM. The memory map can also identify one or more data items as being stored in the allocated portion of RAM, as well as the locations, or addresses, of the data items in the allocated portion of RAM. The memory map can also identify the locations, or addresses, of available portions of the allocated portion of RAM. In response to the virtual machine's request, the RAM module adds information identifying the requested data item to the virtual machine's memory map. This involves determining a location of the requested data item in the allocated portion and updating the memory map to indicate that the requested data item is available by accessing the determined location. This can also involve updating information in the map that identifies those portions of RAM allocated to the virtual machine, e.g., if the RAM module allocated additional portions of RAM for the virtual machine in response to the data read request.

In an embodiment, the RAM module also remaps the location identified as storing the requested data item. The memory map identifies addresses or locations that have been allocated to the virtual machine. The data read request may have specified, for example, that the data item be stored at the first location of the allocated portions. In future requests to access this data item, the virtual machine will look for the data item at the first location of the allocated portion of RAM, or will specify the address for the first location as the location from which to read the data item. However, if the requested data item is already present when the virtual machine requests access to the data item, the data item may not be physically present at the first location. Even though the RAM module can update the virtual machine's memory map to indicate that the requested data item is stored in a first RAM location allocated for the virtual machine, the data item may actually be stored at another physical location in the RAM. In such a case, the RAM module remaps the first location of the allocated portion to point to the actual physical location of the data item. In this embodiment, the requested data: item is, subsequent to this operation, shared between the requesting virtual machine and one or more other virtual machines, where the one or more other virtual machines are virtual machines that have previously requested access to the same data item.

In an embodiment, the virtual machine specifies an address, or location, in the RAM as part of the request for a data item. The memory map can also indicate that the requested data item is found at, for example, the first location of the RAM that is allocated for the virtual machine. In this example, the virtual machine specifies the address of the first location as the address to read the requested data item from. The address identified by the memory map as the location of the requested data item may be inaccurate, for example if the data item is shared. In such a case, the RAM module redirects the request from the specified address to the actual location in RAM of the requested data item.

At 240, the RAM module updates a RAM map to identify the location where the requested data item is stored if the data was added, and/or to indicate that the requesting virtual machine has access to the requested data. The RAM map, as noted above, stores information, e.g., fingerprints, that can be used to identify data items stored in the RAM, in addition to storing information that can be used to identify the locations in the RAM of the data items and the virtual machine(s) that have access to the data items stored in the RAM.

Some operations may be omitted in certain embodiments, and other embodiments may include other operations instead of and/or in addition to those depicted in FIG. 2.

Figure 3:
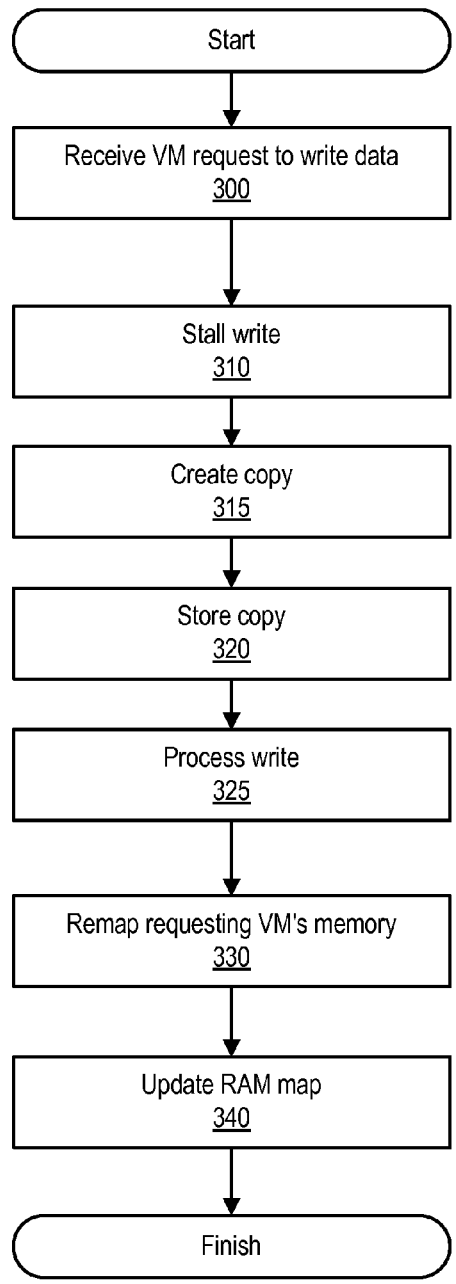
FIG. 3 is a flow diagram of a method processing a write request in a virtual environment, according to one embodiment.

FIG. 3 is a flow diagram of a method of writing to RAM in a virtual environment, such that a shared copy of a data item is not overwritten and can still be shared. The method can be performed by a RAM module, such as RAM module 135 of FIG. 1, using RAM, such as RAM 150 of FIG. 1, and a storage device, such as storage device 180 of FIG. 1, which includes data and metadata, such as data 185 and metadata 190 of FIG. 1.

The method of FIG. 3 begins when a RAM module receives a request from a virtual machine to write to a shared data item stored in a RAM. In an embodiment, the virtual machine's write request specifies a shared data item that is identified in the virtual machine's memory map. The request can include information that identifies the shared data item, such as a block number, file identifier, physical address, fingerprint, or any other information that the RAM module can use to uniquely identify the data item. In an embodiment, the RAM module detects that the shared data item is stored as a read-only data item.

The RAM module delays, or stalls, the write of the new or modified data item, as shown at 310. In an embodiment, the RAM module writes the new data item to a temporary staging location in RAM. This can involve writing a portion of the shared data item to a staging area, e.g., the updated portion, or writing the entire shared data item to the staging area.

Next, the RAM module creates a copy of the original, or unmodified, data item that is to be overwritten, as shown at 315. In an embodiment, the RAM module writes the copy of the unmodified data item to a temporary staging location in RAM. This can involve writing a portion of the unmodified data item to a staging area, e.g., the portion that is to be updated, or writing the entire shared data item to the staging area.

At 320, the RAM module stores a copy of the original data in RAM allocated to the virtual machine that requested the write. In an embodiment, this involves allocating RAM for the virtual machine and updating the virtual machine's memory map to indicate that additional RAM has been allocated At 325, the RAM module processes the write. This involves overwriting the copy of the unmodified data item in the writing virtual machine's RAM with the new data specified in the write request. In an embodiment, the RAM module also writes the new data to a storage device, such as storage device 180 of FIG. 1. The new data can be deduplicated after being stored in the storage device.

At 330, the RAM module remaps the writing virtual machine's memory map to indicate that the data item is stored in the virtual machine's RAM. At 340, the RAM module updates the RAM map to reflect that the writing virtual machine is no longer sharing the block.

In an alternative embodiment, the new data item and/or the original data item can be written to a storage device. This could occur, for example, if RAM module is unable to allocate additional RAM for the new or original data items. Some operations may be omitted in certain embodiments, and other embodiments may include other operations instead of and/or in addition to those depicted in FIG. 3.

FIG. 4A is a table showing a map of RAM, such as RAM 150 of FIG. 1. The table includes information identifying one or more blocks of data stored in the RAM. While this example refers to blocks, it is understood that the table can include information identifying any type of data item, such as a chunk, file, or portion of a file. The table also includes a fingerprint for each block, a physical address where the block is stored in RAM, an indication of which virtual machine the physical address is allocated for, and information specifying which virtual machines share the block. In the example of FIG. 4A, block 1 is identified by fingerprint value X. The block identified by X is stored at a physical location beginning at the address 0x00. The physical location beginning at 0x00 is allocated to a virtual machine 1. This block (the block identified by the fingerprint value X, is shared by virtual machine 1 and virtual machine 3. Block 2 is identified by fingerprint value B. The block identified by B is stored at a physical location beginning at the address 0x4K. The physical location beginning at 0x4K is allocated to a virtual machine 2. This block (the block identified by the fingerprint value B, is shared by virtual machine 2 and virtual machine 8. Block 3 is identified by fingerprint value T. The block identified by T is stored at a physical location beginning at the address 0x8K. The physical location beginning at 0x8K is allocated to a virtual machine 1. This block (the block identified by the fingerprint value T, is shared by virtual machine 1 and virtual machine 2. A RAM module, such as RAM module 135 of FIG. 1, can use the table of FIG. 4A to manage data items shared by virtual machines, such as virtual machines 110 of FIG. 1.

FIG. 4B is a block diagram showing a map of RAM, such as RAM 150 of FIG. 1, allocated to a first virtual machine, such as virtual machine 110(1) of FIG. 1. The map includes information identifying which blocks the virtual machine has requested access to, and physical locations allocated to the virtual machine. In this example, the virtual machine has requested access to blocks 1 and 3, which are identified as being stored in RAM at locations 0x00 and 0x8K, respectively. The map indicates that locations in RAM beginning at 0x00 and continuing through 0x56K are allocated for this virtual machine. It is noted that the listed blocks are not necessarily stored at the corresponding locations identified by the table. As described above, if the blocks are shared, the blocks can be stored at another location in RAM. A RAM module, such as RAM module 135 of FIG. 1, can use the table of FIG. 4B to manage data items accessible by the virtual machine.

FIG. 4C is a block diagram showing a map of RAM, such as RAM 150 of FIG. 1, allocated to a second virtual machine, such as virtual machine 110(2) of FIG. 1. The map includes information identifying which blocks the virtual machine has requested access to and physical locations allocated to the virtual machine. As shown in FIG. 4A, the virtual machine has requested access to block 3 and locations in RAM beginning at 0x192K through 0x248K have been allocated for this virtual machine. FIG. 4A shows that block 3 is actually stored at location 0x8K, despite apparently being stored at location 0x192K, as shown in the memory map for the second virtual machine.

Figure 5:
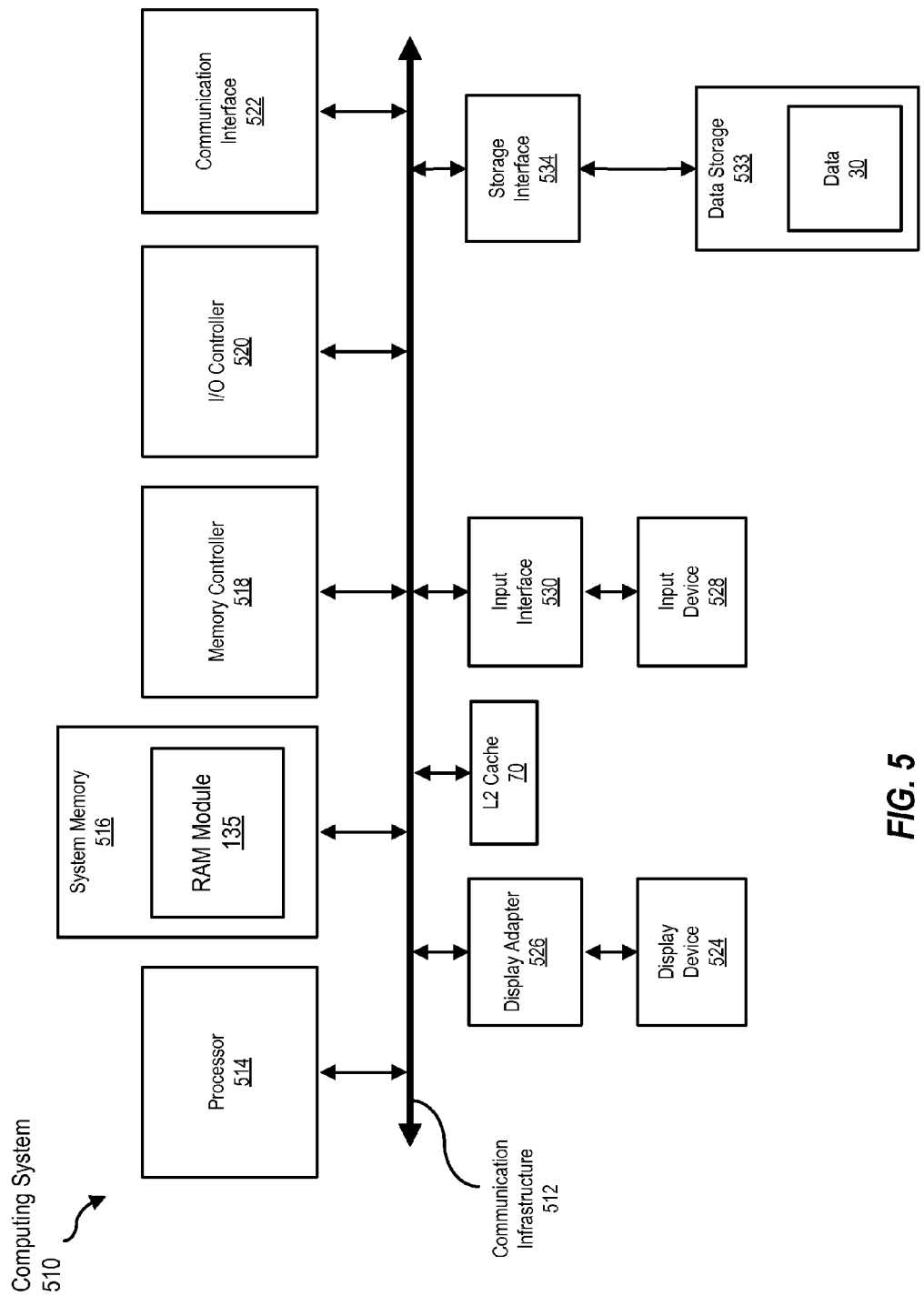
FIG. 5 is a block diagram of a computing device, illustrating how a RAM module can be implemented in software, according to one embodiment.

FIG. 5 is a block diagram of a computing device, illustrating how a RAM module 135 can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a RAM module 135, computing system 510 becomes a special purpose computing device that is configured to participate in archive operations.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a RAM module 135 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
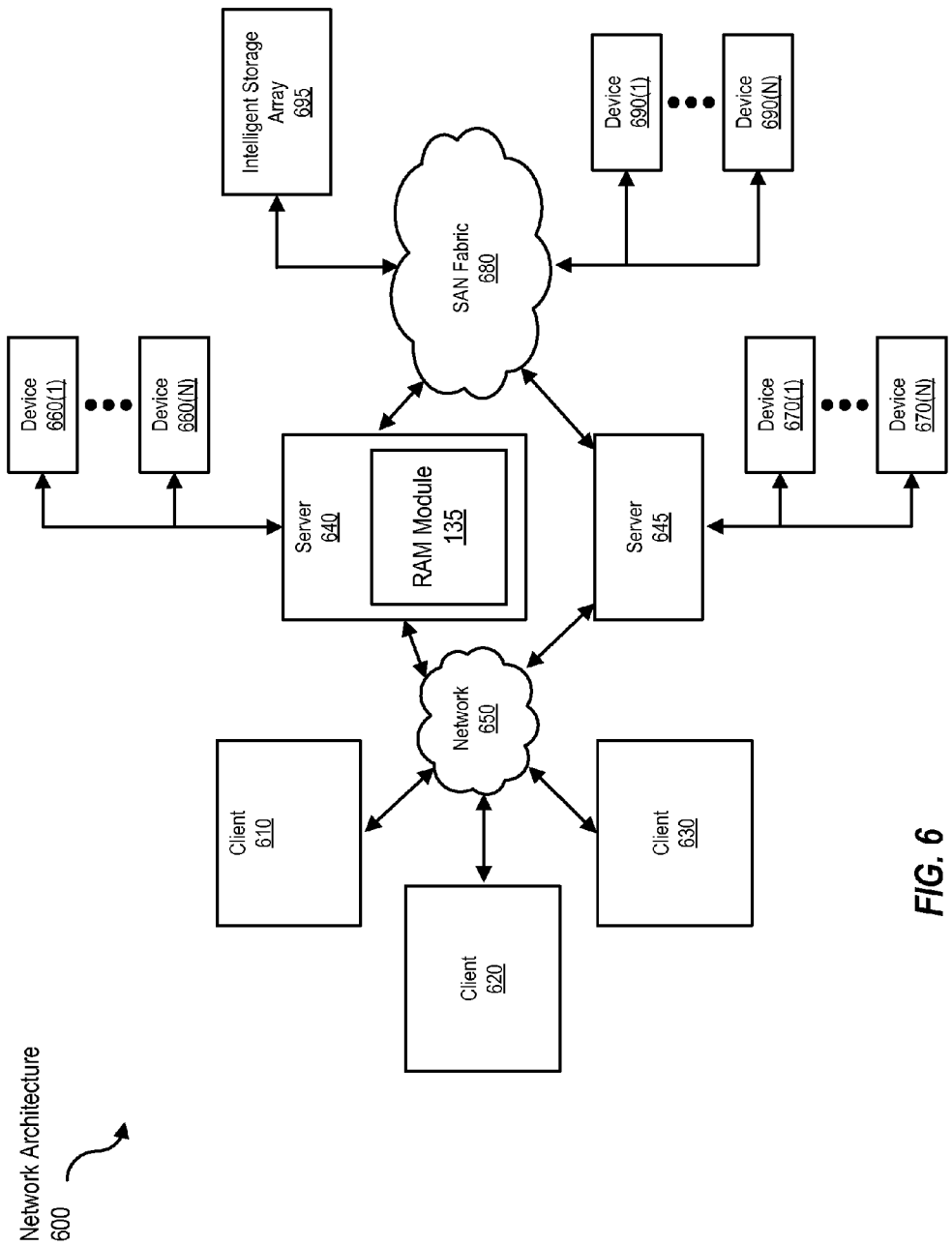
FIG. 6 is a block diagram of a networked system, illustrating how various computing devices can communicate via a network, according to one embodiment.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include a RAM module 135 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archive module in FIG. 1 may transform behavior of a computing device in order to cause the computing device to store and manage data operations in a RAM.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  receiving a request to access data, wherein
    the request is received from a virtual machine (VM) of a plurality of VMs;
  retrieving a signature for the data, wherein
    the signature is retrieved from a first signature map,
    the signature is calculated using a hash function,
    the first signature map comprises a first plurality of signatures that identify data stored in a first data store coupled to a host, and
    at least one VM of the plurality of VMs is installed on the host;
  detecting whether a second signature map comprises the signature, wherein
    the second signature map comprises a second plurality of signatures that identify data stored in a random access memory (RAM) comprised by the host, at least one of the second plurality of signatures is calculated using the hash function, and
the detecting comprises comparing the signature with one or more signatures of the plurality of signatures in the second signature map;
if the second signature map comprises the signature, granting the request; and
if the second signature map does not comprise the signature, adding the signature to the second signature map.

2. The method of claim 1, further comprising:
adding an identifier for the VM to the second signature map.

3. The method of claim 1, wherein
the data comprises an operating system (OS) component.

4. The method of claim 1, wherein accessing data from the first data store is slower than accessing data from the RAM.

5. The method of claim 1, further comprising
reading the data from the first data store, wherein
the first data store comprises a single instance storage (SIS) device,
the request specifies a block identifier, and
the reading comprises determining a file identifier corresponding to the block identifier.

6. The method of claim 1, further comprising:
receiving a request to write a chunk of data;
detecting whether the chunk is stored in the RAM;
if the chunk is stored in the RAM, creating a copy of the chunk;
allocating a location in the RAM;
writing the chunk to the location in the RAM; and
modifying the second signature map.

7. A system comprising:
one or more processors; and
memory coupled to the one or more processors, wherein
the memory stores program instructions executable by the one or more processors to:
receive a request to access data, wherein
the request is received from a virtual machine (VM) of a plurality of VMs;
retrieve a signature for the data, wherein
the signature is retrieved from a first signature map,
the signature is calculated using a hash function,
the first signature map comprises a first plurality of signatures that identify data stored in a first data store coupled to a host, and
at least one VM of the plurality of VMs is installed on the host;
detect whether a second signature map comprises the signature, wherein
the second signature map comprises a second plurality of signatures that identify data stored in a random access memory (RAM) comprised by the host,
at least one of the second plurality of signatures is calculated using the hash function, and
detecting whether the second signature map comprises the signature comprises comparing the signature with one or more signatures of the plurality of signatures in the second signature map;
if the second signature map comprises the signature, grant the request; and
if the second signature map does not comprise the signature, add the signature to the second signature map.

8. The system of claim 7, wherein the instructions are further executable to:
add an identifier for the VM to the second signature map.

9. The system of claim 7, wherein
the data comprises an operating system (OS) component.

10. The system of claim 7, wherein accessing data from the first data store is slower than accessing data from the RAM.

11. The system of claim 7, wherein the instructions are further executable to:
read the data from the first data store, wherein
the first data store comprises a single instance storage (SIS) device,
the request specifies a block identifier, and
the reading comprises determining a file identifier corresponding to the block identifier.

12. The system of claim 7, wherein the instructions are further executable to:
receive a request to write a chunk of data;
detect whether the chunk is stored in the RAM;
if the chunk is stored in the RAM, create a copy of the chunk;
allocate a location in the RAM;
write the chunk to the location in the RAM; and
modify the second signature map.

13. A non-transitory computer readable storage medium comprising program instructions executable to:
receive a request to access data, wherein
the request is received from a virtual machine (VM) of a plurality of VMs;
retrieve a signature for the data, wherein
the signature is calculated using a hash function,
the first signature map comprises a first plurality of signatures that identify data stored in a first data store coupled to a host, and
at least one VM of the plurality of VMs is installed on the host;
detect whether a second signature map comprises the signature, wherein
the second signature map comprises a second plurality of signatures that identify data stored in a random access memory (RAM) comprised by the host,
at least one of the second plurality of signatures is calculated using the hash function, and
detecting whether the second signature map comprises the signature comprises comparing the signature with one or more signatures of the plurality of signatures in the second signature map;
if the second signature map comprises the signature, grant the request; and
if the second signature map does not comprise the signature, add the signature to the second signature map.

14. The non-transitory computer readable storage medium of claim 13, wherein
the data comprises an operating system (OS) component.

15. The non-transitory computer readable storage medium of claim 13, wherein accessing data from the first data store is slower than accessing data from the RAM.

16. The non-transitory computer readable storage medium of claim 15, wherein the instructions are further executable to:
read the data from the first data store, wherein
the first data store comprises a single instance storage (SIS) device,
the request specifies a block identifier, and
the reading comprises determining a file identifier corresponding to the block identifier.

17. The non-transitory computer readable storage medium of claim 13, wherein the instructions are further executable to:
receive a request to write a chunk of data;
detect whether the chunk is stored in the RAM;

if the chunk is stored in the RAM, create a copy of the chunk;
allocate a location in the RAM;
write the chunk to the location in the RAM; and
modify the second signature map.

\* \* \* \* \*

UNITED STATES PATENT AND TRADEMARK OFFICE
CERTIFICATE OF CORRECTION

PATENT NO.        : 8,966,188 B1
APPLICATION NO.   : 12/968417
DATED             : February 24, 2015
INVENTOR(S)       : Trimbak Somnathappa Bardale It is certified that error appears in the above-identified patent and that said Letters Patent is hereby corrected as shown below:

Claims:

Column 15
Line 4, in Claim 1, replace: "the plurality" with -- the second plurality --
Line 57, in Claim 7, replace: "the plurality" with -- the second plurality --

Column 16
Line 27, in Claim 13, insert: -- the signature is retrieved from a first signature map, -- immediately before "the signature is calculated using a hash function,"
Line 42, in Claim 13, replace: "the plurality" with -- the second plurality --

Signed and Sealed this
Thirty-first Day of May, 2016

Michelle K. Lee
*Director of the United States Patent and Trademark Office*